United States Patent [15] 3,675,200

Bossen et al. [45] July 4, 1972

[54] SYSTEM FOR EXPANDED DETECTION AND CORRECTION OF ERRORS IN PARALLEL BINARY DATA PRODUCED BY DATA TRACKS

[72] Inventors: Douglas C. Bossen, Wappingers Falls; Robert A. Henle, Hyde Park; Mu Y. Hsiao, Poughkeepsie; Gerald A. Maley, Fishkill; W. David Pricer, Poughkeepsie, all of N.Y.

[73] Assignee: International Business Machines Corporation, Armonk, N.Y.

[22] Filed: Nov. 23, 1970

[21] Appl. No.: 91,726

[52] U.S. Cl...........340/146.1 F, 340/146.1 AL, 340/174.1 B
[51] Int. Cl...................................G06f 11/08, G06k 5/00
[58] Field of Search...............340/146.1 F, 174.1 B; 235/153

[56] References Cited

UNITED STATES PATENTS 3,262,097 7/1969 Miller..............................340/146.1 F
3,551,886 12/1970 Cook..............................340/146.1 F
3,518,625 6/1970 Agin................................340/146.1 F
3,142,829 7/1964 Comstock.........................340/174.1 B

*Primary Examiner*—Charles E. Atkinson
*Attorney*—Hanifin and Jancin and Julius B. Kraft

[57] ABSTRACT

Errors in parallel binary data produced by a plurality of data track, e.g., a plurality of parallel shift registers, are corrected by a system in which the shift registers which are stuck, i.e., inalterable, are determined and counted. By single Hamming error detection means, the presence of a Hamming error and an indication of the bit position of a single Hamming error is made. Comparison means determine if the indicated Hamming error is coincident with a stuck track. Then, dependent on the parity condition of the data as well as the count of stuck tracks, apparatus is provided for complementing one or more of the stuck tracks and/or correcting the indicated Hamming error.

38 Claims, 9 Drawing Figures

INVENTORS
DOUGLAS C. BOSSEN
ROBERT A. HENLE
MU Y. HSIAO
GERALD A. MALEY
W. DAVID PRICER

BY J. B. Kraft
ATTORNEY

Patented July 4, 1972 3,675,200

5 Sheets-Sheet 4

| | TRACK 1st | 2nd | 3rd | 4th | 5th | 6th | 7th | P |
|---|---|---|---|---|---|---|---|---|
| A | 1 | 1 | 0 | 1 | 1 | 0 | 0 | 0 |
| B | 0 | 0 | 0 | 0 | 0 | 0 | 0 | 0 |
| C | 0 | 0 | 1 | 1 | 1 | 0 | 0 | 1 |
| D | 1 | 1 | 1 | 0 | 0 | 0 | 0 | 1 |
| E | 0 | 1 | 0 | 0 | 1 | 0 | 1 | 1 |
| F | 1 | 0 | 0 | 1 | 0 | 0 | 1 | 1 |
| G | 1 | 0 | 1 | 0 | 1 | 0 | 1 | 0 |
| H | 0 | 1 | 1 | 1 | 0 | 0 | 1 | 0 |
| I | 1 | 0 | 0 | 0 | 1 | 1 | 0 | 1 |
| J | 0 | 1 | 0 | 1 | 0 | 1 | 0 | 1 |

SYSTEM FOR EXPANDED DETECTION AND CORRECTION OF ERRORS IN PARALLEL BINARY DATA PRODUCED BY DATA TRACKS

BACKGROUND OF THE INVENTION

1. Field of the Invention

The present invention relates to error correction of a parallel binary bit data pattern such as that constituting a word. More particularly, it relates to a system which expands the potential of error correcting and detecting codes, e.g., Hamming codes.

2. Description of the Prior Art

The errors which occur in binary data patterns utilized in digital computers may be conveniently put into one of two catagories: transient or random errors and hard errors. Transient errors may be due to an error in coding or in operating the computer or to stray or intermittent electronic effects in the computer circuitry. Transient errors are usually not repeated during subsequent similar data processing operations. On the other hand, hard errors are due to some specific malfunction in the computer circuitry and may be expected to continue to appear during subsequent operation.

Because of the high cost of "computer time," it is, of course, desirable to maintain the computer in operating condition for as long as possible. Consequently, the art has devised self-correcting error codes for the computer which permit the computer to detect an error and correct the error while continuing to routinely operate. It should be noted that such error-correction techniques do not correct the cause of the error, but rather correct the data containing the indicated error. If the error is a transient error, the cause of the error should quickly disappear and correct data will be produced during subsequent operation. However, even if the error is a hard error, the correction system could continually correct such an error condition, thereby permitting the computer to continue to function and produce good data despite a permanent defect. This permits the computer to provide a maximum of desirable operative time.

The standard error-detecting and correcting codes presently being used throughout the art are Hamming codes. Such codes are described generally in the text "Introduction to Digital computers," Maley and Heilweil, Prentice Hall Inc., 1968, pp. 28–30 and in the text "Logical Design of Digigal Computers," M. Phister, John Wiley & Sons, Inc., 1958, pp. 329–330, and described in greater detail in the article "Error Detecting and Error Correcting Codes," by R. W. Hamming, The Bell System Technical Journal, April 1950, pp. 147–160 and in U.S. Pat No. Re. 23,601, R. W. Hamming et al.

The most commonly used Hamming detecting and correcting code is a single-error correcting code which can be used in combination with a parity check for the particular binary data pattern to provide a single-error correcting double-error detecting code. In other words, with this technique, a single detected error can be corrected. However, if there are two errors in the line of parallel binary data, this condition can be detected using the parity bit combination with the Hamming code means. This Hamming code cannot correct the double-error condition. Further, three or more errors are not capable of detection. While double-error correcting and detecting code means have been disclosed in the art, the system required to implement such double-error correction is quite complex and relatively difficult to implement.

While the standard single-error correcting Hamming code means have been found to be entirely adequate for data stored in random access memory systems, it is believed that single-error correcting code means may present potential problems in correcting data taken from sequential access storage devices, such as discs and drums and particularly electronically rotatable or cycling memory units. In such sequential access storage devices, the binary data is stored in an array of banks, each of which contains a plurality of parallel rotating or cycling data tracks from which the parallel binary data or words are produced. In such sequential access storage means, there appears to be an increased potential for errors in parallel data removed from the memory. This appears due to the likelihood that an error at any point in a data track of a sequential access storage system is likely to affect the whole track. On the other hand, in random access memory systems, it is less likely that an error in a particular cell or core in a storage matrix will affect other units in the matrix. This greater tendency towards errors in sequential access storage system is expected to be particularly significant in sequential access semiconductor integrated circuit memory systems such as systems employing a plurality of shift register tracks formed on one or more semiconductor chips.

A memory system of this type is described in copending application Ser. No. 889,435, William Beausoleil, filed on Dec. 31, 1969 and now U.S. Pat. No. 3,648,255 issued Mar. 14, 1972. In this system, parallel binary data is stored across a bank of electronically cycled tracks formed by integrated circuit semiconductor elements. The tracks are shift registers; the data stored in these shift registers must be regenerated periodically. This is done by means of a high-speed clock operating in conjunction with a low-speed clock. During the inactive or storage cycle of the memory, the data stored in these shift register tracks is regenerated by slow cycling under control of the low-speed clock which periodically shifts each of the bits stored in the track to the next succeeding position. Then, during the active phase, when it is desired to remove a word of data from across a bank of cycling shift registers or tracks, the data in the registers is cycled by shifting from one position to the next at a higher speed until the address of the selected word is reached.

Since the track or shift register is formed as an integrated semiconductor circuit, if a defect occurs in the semiconductor elements associated with any position on the track, the likelihood is very great that the data stored throughout the track will be erroneous because every bit on the track would have to be circulated through the defective point in order to complete one cycle. Such an erroneous track is known as a stuck or inalterable track.

Because sequential access storage devices are extensively used as auxiliary storage apparatus associated with the control processing unit of a computer system, there is a need for an error-correcting system of expanded potential.

SUMMARY OF THE INVENTION

Accordingly, it is a primary object of the present invention to provide an error-correction/detection system of increased potential to be used for checking parallel data produced by sequential access storage means containing a plurality of tracks.

It is another object of the present invention to provide such an error-correction/detection system to be used on parallel data produced by a bank of semiconductor shift registers.

It is a further object of the present invention to provide such an error-correction/detection system which is capable of distinguishing whether the errors in the parallel binary data are produced by stuck tracks or by other conditions.

It is yet another object of the present invention to provide such an error-correction/detection system which has the capability of correcting errors in data produced by stuck tracks in addition to correcting errors in the data produced by other conditions.

The usefulness of the present invention is based upon the provision of apparatus for effectively determining which of a plurality of cycling data tracks is in the stuck or inalterable condition. This is accomplished by the novel expedient of inserting at a fixed position in the cycling data track, a check bit which is the binary complement of the next preceding bit. Detecting means are associated with each cycling data track being read which sense a change in the binary state of data being cycled in the track. The check bit and next preceding bit in the data track are cycled past the detecting means; this is conveniently accomplished by putting the data track through one cycle, thereby insuring the passage of the check bit and preceding bit through the detecting means. Means are provided for indicating that the track is in a stuck condition in the absence of a detected change in the binary state during such a cycle. In addition, means are provided for counting the tracks in the stuck condition.

The expanded error-correction/detection capability of the correction system of the present invention is achieved by a combination of the above-described stuck track detection and counting means with means for detecting the presence of an error condition in the parallel binary data or word produced by a bank of tracks and for indicating a bit position in said data pattern; this indicated bit position corresponds to the actual error in the data only when a single error is present in the parallel data. Such a single-error detecting means may be the customary single-error correction/detection Hamming code means. As will be hereinafter explained in greater detail in the description, we have found that single-error Hamming correction/detection means will only point to the proper bit actually in error when only a single error is present in the parallel data pattern. If two or three errors are present, conventional Hamming code single-error correction/detection will never point to one of the actual errors, but rather will point to a bit which is not in error. Also, it should be understood that an indication that a particular track is stuck does not alone indicate whether the bit in the parallel data pattern produced by the stuck track is in error, i.e., a stuck track is stuck either at a "1" binary bit or a "0" bit, and the bit at which the track is stuck may by chance be the correct one for the word.

Based in part upon these two properties, a correlation may be made between the particular track indicated to be stuck and the information detected by the Hamming code means which is the presence of an error condition and the indicated position alleged for the error. Such a correlation involves means for determining if the indicated error by the Hamming code means is coincident with a stuck track. The combination further includes standard parity checking means for the binary data pattern which in combination with the Hamming code means, will indicate whether an even number of errors are present in the binary pattern. Thus, the correlating means has the capability of correlating the detected parity error, Hamming error condition, the indicated stuck track and the count of stuck track with the presence or absence of a coincidence between a stuck track and a Hamming error in order to correct the errors either through means for complementing one or more of the stuck tracks or correcting a single Hamming error by conventional means, or both.

As will be hereinafter described in greater detail, based upon the nature of the data pattern, it is possible to determine in advance which correlated combination of parity error, bit error, coincident and stuck track conditions and stuck track count should indicate particular sequences of stuck track complementing and Hamming error correcting in order to expand the error-correcting capability and error-detecting capability of the system with respect to the parallel binary data pattern being checked.

The foregoing and other objects, features and advantages of the invention will be apparent from the following more particular description and preferred embodiments of the invention as illustrated in the accompanying drawings.

DESCRIPTION OF THE PREFERRED EMBODIMENTS

Figure 1:
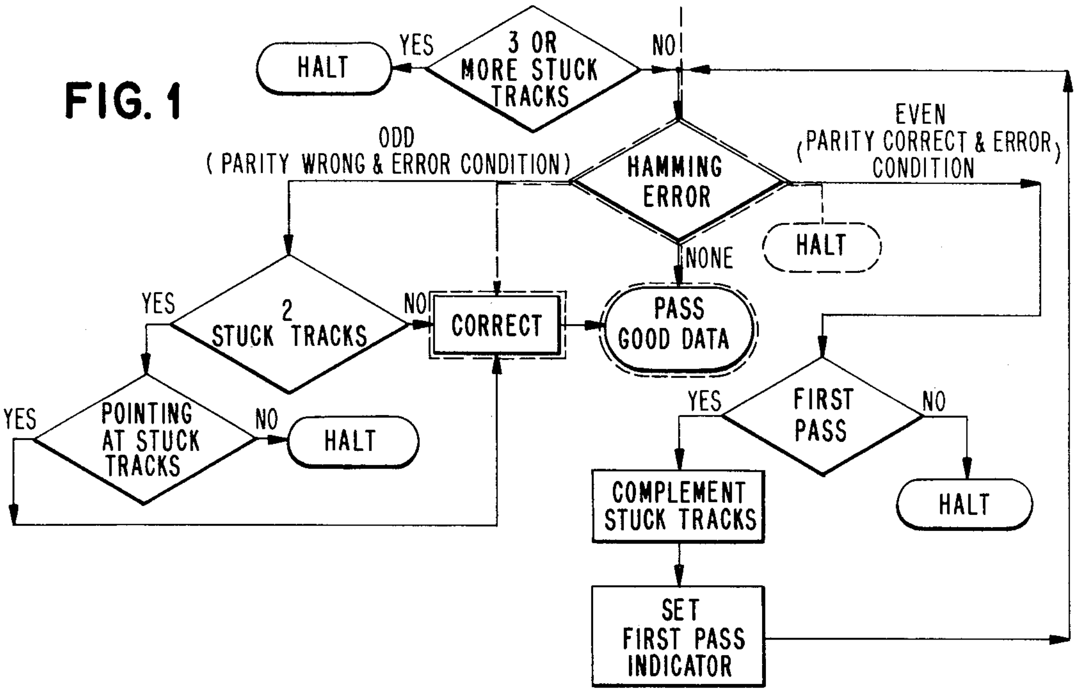
FIG. 1 is a flow chart of an illustrative system embodying the present invention.

FIG. 1 is a flow chart of an embodiment of the system of the present invention illustrating how the combination of detecting and correcting means of the present invention substantially expand error detecting and correcting capability with respect to parallel binary data produced by a plurality of cycling tracks.

With reference to FIG. 1, the section of the flow chart shown or enclosed in dashed lines, shows the maximum capability of a single-error correction/double-error detecting Hamming code system conventionally used in the prior art for detection and correction of errors in parallel binary data. This Hamming code system is essentially a single-error correcting/single-error detecting Hamming code system which includes a parity check bit to increase the capability to double-error detection. Following the dotted line in the first step, the conventional system detects whether there is an odd or an even number of Hamming errors or no Hamming errors. If there are no errors, the data is passed as good. If there is an odd number of errors, a condition which is determined by the combination of a Hamming error indication plus a wrong parity check, it is assumed that there is one error present, and the error is corrected and the data passed as good. If it is determined that there are an even number of errors present, indicated by the combination of a Hamming error condition plus a correct parity condition, it is assumed that there is a double error present and the system is halted since it can only detect and not correct such a condition.

On the other hand, the detection and correction system of the present invention has an expanded capability illustrated by the flow chart in FIG. 1 where the unbroken lines and enclosures indicate the detection and correction steps possible with the present invention. The system illustrating the present invention involves the following steps. First, a determination is made as to the number of stuck tracks. If there are three or more stuck tracks, the operation is halted and an appropriate signal given. If there are less than three stuck tracks, a determination is made as to the Hamming error condition. If there are an odd number of Hamming errors present as indicated by a combination of wrong parity and the indication of a Hamming error, the assumption is not automatically made as in the prior art that there is only one error in the data and the error pointed to by the Hamming code system corrected. Rather, a decision is first made as to whether there are two stuck tracks. If there are not two stuck tracks, then the Hamming error pointed to is corrected and the data passed as good. However, if there are two stuck tracks present, then a determination is made as to whether the Hamming error pointed to is coincident with one of the indicated stuck tracks. If there is such a coincidence, then that indicated Hamming error is corrected and the data passed as good. On the other hand, if the indicated Hamming error is not coincident with one of the stuck tracks, the operation is halted and a signal given indicative of a fault condition involving two stuck tracks plus an additional independent Hamming error. In explanation as to why these decisions are made in the case of two stuck tracks, first, if there are not two stuck tracks, then there are either none or one stuck track. If there are no stuck tracks, then it can be safely assumed that there is one random error and that error is corrected. If there is one stuck track, it can also be safely assumed that the indicated Hamming error is in the stuck track and that Hamming error is then corrected.

In following these operations, it should be understood that a stuck track need not be in error; the track may be either stuck at a bit which is correct for the particular parallel data, in which case that bit would not show up as a Hamming error, or track may be stuck at a bit which is incorrect for the particular parallel data, in which case that bit will show up as a Hamming error. For convenience, we can classify stuck tracks whether in error or not, as faults, and also classify random or transient errors as faults.

With this in mind then, where there is an indication of two stuck tracks and the indicated Hamming error does not coincide with a stuck track, the system is halted and an appropriate signal given to the operator noting the detection of a triple-fault condition including two stuck tracks plus an additional random error. Conversely, if there are two stuck tracks and the indicated random error is pointing at a stuck track (indicating coincidence) then it may be correctly assumed that one of the tracks is stuck at an error condition for that particular data and that a double-fault condition exists (two stuck tracks) which the apparatus can correct by correcting the indicated Hamming error and then passing the data as good.

Let us now consider the other branch of the flow chart. Where there is an indication of an even number of Hamming errors by virtue of the combination of an indicated Hamming error plus a correct parity, then if this is the first pass in the system, all of the bits in the parallel binary data pattern produced by stuck tracks are complemented. An indication is made that the first pass is completed and the complemented parallel data is returned to the Hamming error detection means for a determination as to whether the error condition has changed. The following possibilities may occur: the Hamming error condition may change from even to odd, in which case it can be handled along the odd branch of the flow chart as previously indicated; the Hamming errors may disappear, in which case the data may be passed as good, or the Hamming error condition may remain even, in which case since the first pass has been completed as previously indicated, the system is then halted with a signal to the operator indicating the detection of two Hamming errors which cannot be corrected by complementing the stuck tracks.

Figure 2C:
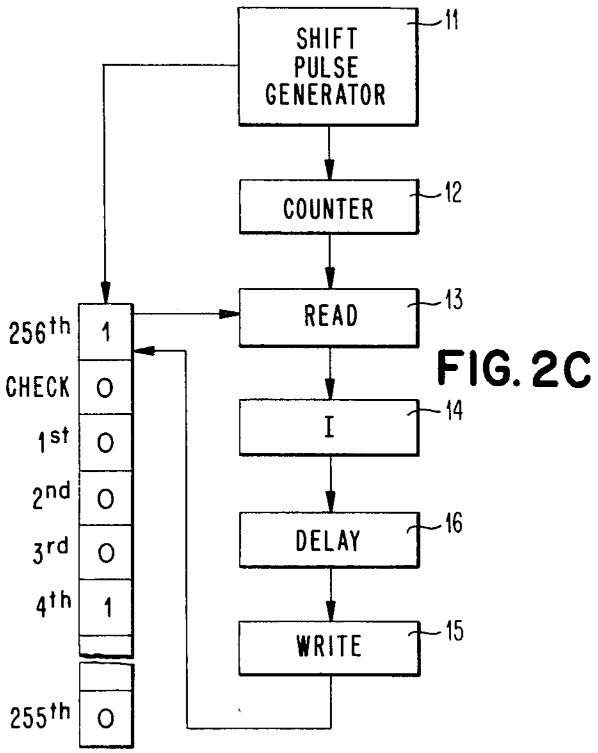
FIG. 2C is a circuit logic diagram of the means for introducing into each data track, the check bit which is the complement of the next preceding bit.
Figure 2:
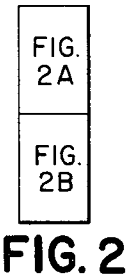
FIG. 2 is a layout sketch showing the relationship between FIGS. 2A and 2B.
Figure 2A:
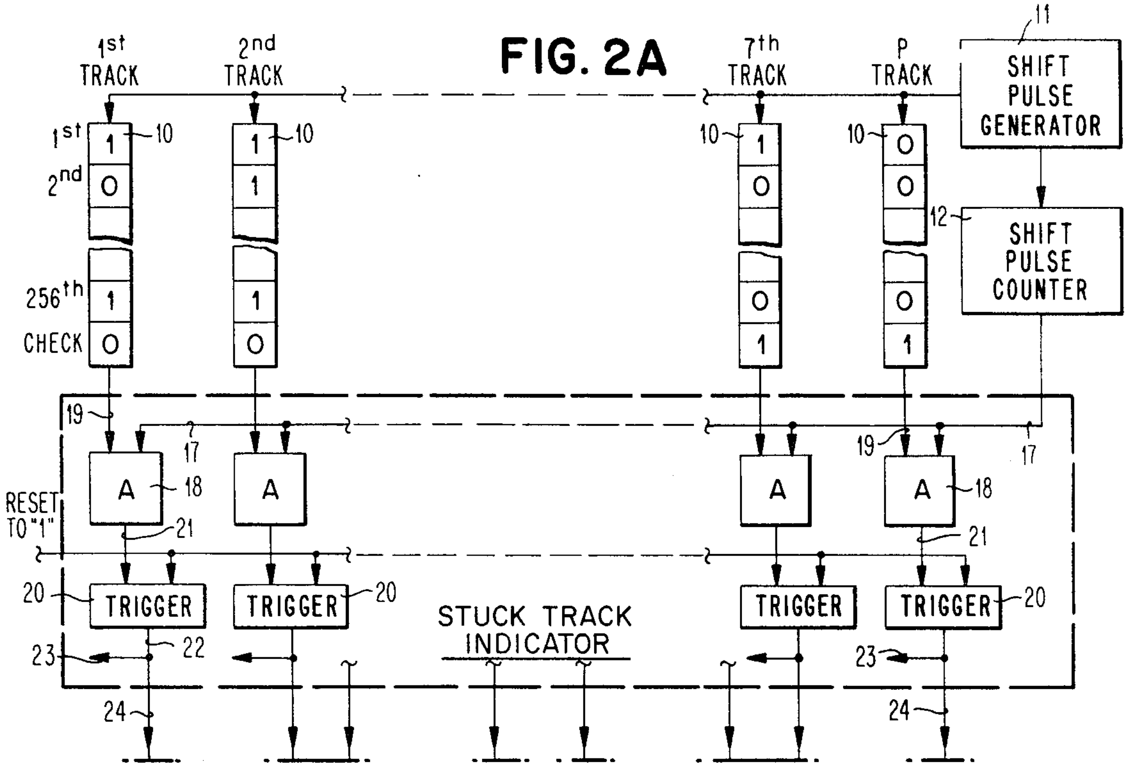
FIG. 2A is a diagram of the circuit logic used in indicating which tracks are stuck.
Figure 2B:
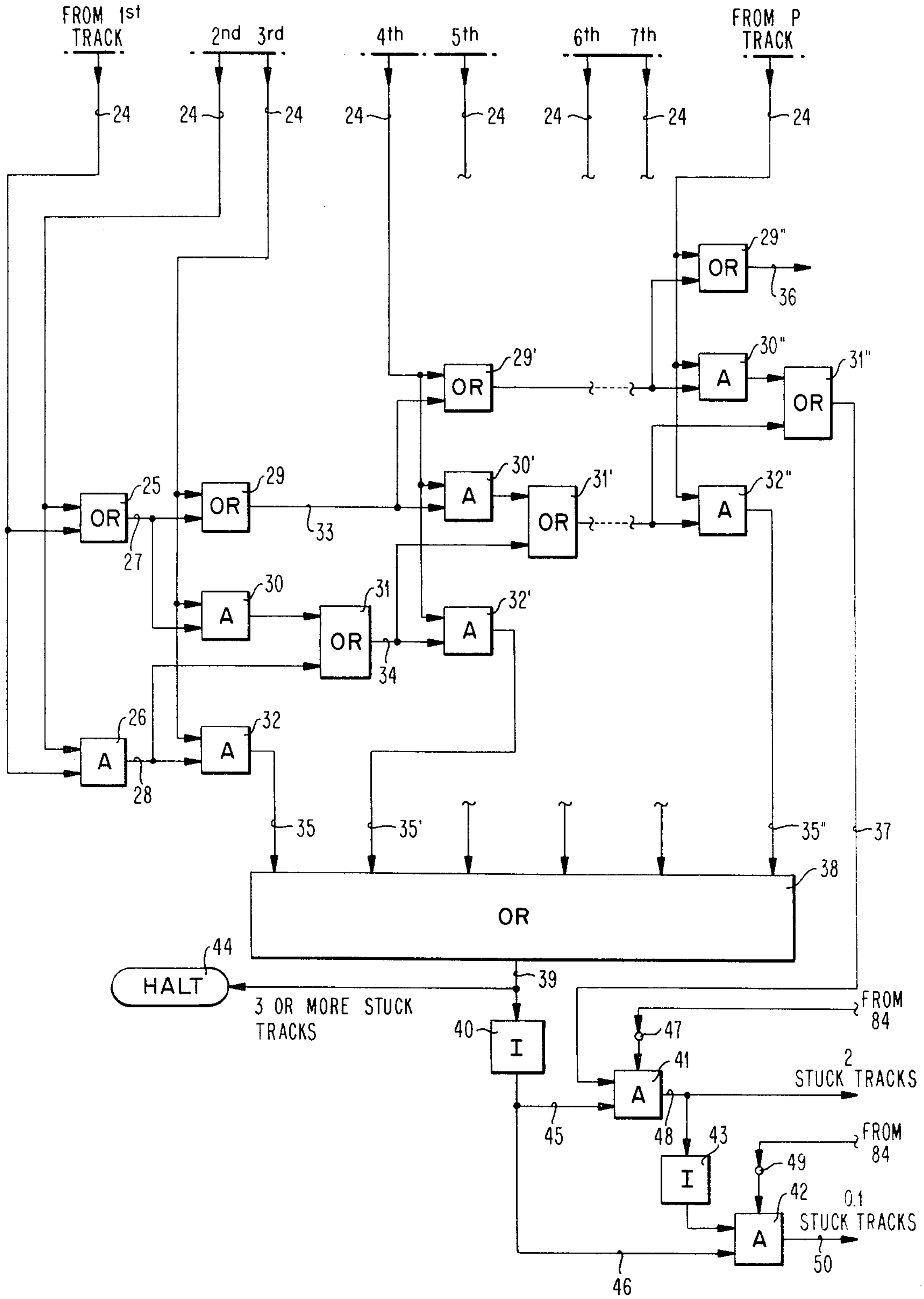
FIG. 2B is a diagram of the circuit logic used in counting the stuck tracks.

With reference to the circuits shown in FIGS. 2A, 2B, 2C, 3 and 4, there will now be described circuitry capable of implementing the flow chart shown in FIG. 1. For the purposes of this description the bank of cycling data tracks providing the parallel binary data patterns or words will be a bank of shift registers formed as integrated semiconductor circuits of the type described in previously mentioned copending application Ser. No. 889,435, now U.S. Pat. No. 3,648,255 issued Mar. 14, 1972. A bank of eight of these shift registers or tracks 10 is shown in FIG. 2A. These eight tracks produce an eight-bit binary data pattern in which the groupings are coded in accordance with the single-error correcting/double-error detecting code tabulated in FIG. 5. In this code, the first, second and fourth bits of the word are Hamming bits and the eighth or P bit is a parity bit. There are four actual information bits, the third, fifth, sixth and seventh bits. The eight-bit words have been selected primarily for convenience in description, and will be understood that the correction system of the present invention will apply to words of any length as long as there are sufficient bits present for the Hamming and parity checks.

The tracks shown each contain 256 bits of electronically cycling binary data. Each of shift registers 10 may be any one of a number of known dynamic shift registers for electronically cycled data. The details of such shift registers are described on page 81 of an article by R. L. Petritz, entitled "-Current Status of Large-Scale Integration Technology," published in the 1967 "Proceedings of the Fall Joint Computer Conference." One embodiment of such a shift register is described in copending application Ser. No. 889,435, now U.S. Pat. No. 3,648,255 issued Mar. 14, 1972. In such a shift register, the data stored must be periodically regenerated. This is done by means of a high-speed clock operating in conjunction with a low-speed clock. During the inactive or storage cycle of the storage means or memory which is comprised by the bank of shift registers, the data stored in the shift register is regenerated by low-speed cycling under the control of the low-speed clock which periodically shifts each of the bits stored in each track to the next succeeding position. Then, during the active phase of the memory, when it is desired to remove a word of data from across a bank of cycling shift registers or tracks, the data in the registers is cycled by shifting from one position to the next succeeding position at a higher speed until the address of the selected word is reached. In FIG. 2A, we have not shown the high-speed or low-speed clocks. However, it is to be noted that shift pulse generator 11 which provides the shift pulses to the eight shift registers 10, is selectively controlled by either a low-speed clock or a high-speed clock to maintain the data stored in the registers circulating at either the low-speed or the high-speed required by the particular storage stage.

Considering now the means for determining which tracks are stuck, each track or shift register 10 in FIG. 2A contains a 257th or check bit immediately succeeding the 256th bit. This check bit is the binary complement of the 256th bit. This check bit may be inserted into the shift register by a technique which involves inverting the binary value of the 256th bit and putting this value into the 257th or check position in the track. This may be accomplished during the work-up period when data is initially loaded into the track 10. FIG. 2C shows a generalized embodiment of circuitry for accomplishing this. As the shift register is being cycled by means of shift pulse generator 11, counting means 12 counts the number of shift pulses and on the 256th pulse, provides a signal which activates read means 13 to read the binary bit in the 256th position; the value of this bit is inverted by inverting means 14 and the inverted value is reinserted into the track through write means 15 through an appropriate delay 16 which insures that the write means 15 will be activated coincident with the arrival of the 257th or check position at the write position. It is to be noted that there is a read 13, write 15, invert 14 and delay 16 means associated with each of the tracks under the control of a single shift pulse generator 11 and counter 12.

Returning now to FIG. 2A, assume that tracks 10 are all cycling and that each has a check bit which is the complement of the next proceeding or 256th bit. During a given cycle, shift pulse counter 12 keeps track of the pulse count, and during the 256th and 257th pulses, applies a gating signal to each of gating terminals 17 of AND gates 18 of the stuck track indicator circuit. Simultaneously with the application of the gating signal to terminal 17, the binary data in the 256th position followed by the binary data in the check position will be applied to data terminal 19 of the gate 18 associated with the particular track. The signal applied to terminal 19 will be the standard "up" level for a binary "1," and "down" level for a binary "0." The resulting output from each of gates 18 is applied to a binary trigger 20 respectively associated with each of the gates through terminal 21. All of the binary triggers 20 have been previously reset to a value of binary 1. With this arrangement, it will be seen that if the 256th and check bits in a given track are 1 and 0 or 0 and 1, then the output from the associated trigger 20 on output terminal 22 will be down or 0. This is the case because AND gate 18 will have an up output on terminal 21 only once, thereby switching trigger 20 and output 22 to the 0 binary value. On the other hand, if there are a pair of 1's in the 256th and check positions, AND gate 18 will switch trigger 20 twice, from 1 to 0 and back to 1 and output 22 still remain at 1; likewise, if there are a pair of "0's" in the 256th and check positions of a track AND gate 18 will produce no output and trigger 20 will remain at 1. Thus, if track 10 is stuck, terminal 22 will be "up," and if track 10 is not stuck, terminal 22 will be "down." The output of each of terminals 22 is also applied to the corrector circuit associated with each track, shown in FIGS. 3 and 4 by means of line 23 as will be hereinafter described in greater detail Considering now how the stuck track count is obtained, the output terminals 22 from triggers 20 associated with each of the eight tracks are applied through eight corresponding lines 24 to the counter circuit of FIG. 2B. This circuit provides three distinct outputs: one output if three or more of lines 24 are up, indicative of at least three stuck tracks; another output if only two of lines 24 are up, indicative of two stuck tracks; and a third output if none or one of lines 24 are up, indicative of a 0,1 stuck track condition. The first two lines 24 from the first and second tracks are respectively connected to both OR gate 25 and AND gate 26 in the manner shown. If only one of these two first lines is up, only output line 27 from OR gate 25 will be up; if both of these first two lines are up, then both line 27 and output line 28 from AND gate 26 will be up. Line 27 is connected to OR gate 29 and AND gate 30, while line 28 is connected to OR gate 31 and AND gate 32. The output of AND gate 30 is also applied to OR gate 31. In turn, the line 24 indicative of the condition of the third track, is connected to OR gate 29, AND gate 30, and AND gate 32. From the circuitry involved, it follows that if at this point only one of the first three lines 24 is up, then only output line 33 from OR gate 29 will be up. If two of these three lines are up, then, output line 34 from OR gate 31 will also be up. If all of the first three lines 24 are up, then, in addition to lines 33 and 34, output line 35 from AND gate 32 will be up. Since an up output on line 33 is maintained through the circuit via OR gates 29' through 29'', output line 36 will be up if at least one of the eight tracks is stuck. Likewise, since an up output on line 34 is maintained through the circuit via OR gates 31' through 31'', if at least two of the eight tracks are stuck, line 37 will be up. As illustrated in the circuit, an up output on line 28 or line 34, indicative of a stuck track count of at least two, will also be applied to AND gates 32, 32' through 32''. Since line 24 is also applied to these AND gates, it follows that upon reaching a count of three lines 24 which are up after a count of two stuck tracks has been made, a particular one of AND gates 32 through 32'' will be rendered conductive and the line 35 through 35'' associated with this gate will be up and OR gate 38 will be conductive, bringing line 39 up to indicate a condition of three or more stuck tracks. The output on line 39 is inverted by inverter 40 and applied to AND gate 41; line 37 is also applied to AND gate 41. In addition, the inverted output on line 39 is also applied to AND gate 42. Also applied to AND gate 42 is the output of AND gate 41 inverted by inverter 43.

Accordingly, as soon as the count of three or more stuck tracks appears, line 39 goes up and a signal is given to appropriate halting means 44 to halt the apparatus. If the count is less than three stuck tracks, inputs 45 and 46 respectively to AND gate 41 and 42 will both be up. Thus, if there are two stuck tracks, the input in line 37 to gate 41 will also be up, and when the appropriate gating signal is applied to terminal 47, the output 48 of AND gate 41 will be up, while the inverted input to gate 42 will be down. On the other hand, if there are either none or one stuck track, line 37 will be down, line 48 will be down and the inverted input to gate 42 will be up. When an appropriate gating signal is applied to terminal 49 of gate 42, output 50 will then go up to indicate 0,1 stuck tracks. It should be noted that while not needed in the flow chart shown in FIG. 1, if an indication of one stuck track as distinguished from 0 stuck tracks is needed, it may be taken from line 36 which should be up for the one stuck track condition.

Figure 3:
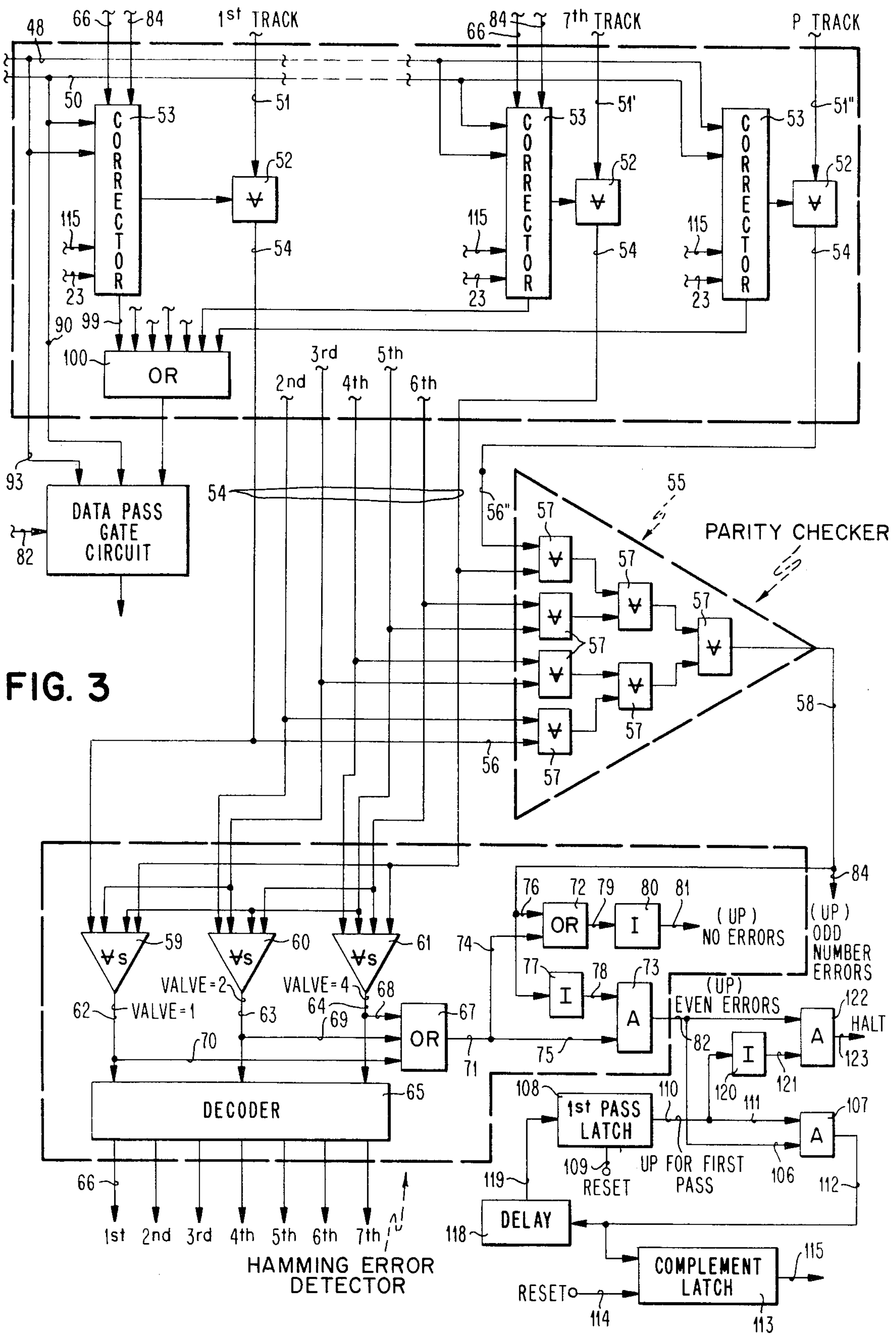
FIG. 3 is a diagram of the circuit logic involved in determining the presence of a Hamming error in the parallel binary data pattern, checking the parity of the parallel binary data, correcting the Hamming error, complementing the stuck tracks and in passing corrected data or uncorrected good data.

With reference to FIG. 3, there will now be described the operation of the Hamming error and parity error detection means. The parallel binary data to be examined for the Hamming and parity error is applied along eight lines 51 through 51'' with each of the lines corresponding to the data in one of the eight tracks. Line 51 will be up for a binary "1" and down for a binary "0." Each of the lines are applied to an Exclusive OR gate 52, each associated with the corrector 53 for the data in the particular track. Since there is no corrections as yet, the data on line 51 will be passed unchanged by the Exclusive OR gate as an output on line 54. Each of lines 54 are applied to parity checker 55 respectively, via eight terminals 56 through 56''. The parity checker 55 contains a tree of Exclusive OR gates 57 to which the inputs are paired in the manner shown to provide an up or binary "1" level on output line 58 in the presence of an odd number of errors in the data pattern, and a down level on line 58 in the case of no errors or an even number of errors in the data pattern. The parity check is an even parity check. In order to detect the Hamming errors, lines 54 are applied to Exclusive OR gate trees 59, 60 and 61 in the following arrangement:

- the lines corresponding to the first, third, fifth and seventh data track bits are applied to Exclusive OR tree 59;
- the lines corresponding to the second, third, fifth, and sixth data bits are applied to Exclusive OR tree 60; and
- the lines corresponding to the fourth, fifth, sixth and seventh data bits are applied to Exclusive OR tree 61.

This arrangement is a conventional arrangement for detecting by Hamming code, the bit position of one error. This provides the single Hamming error detecting means for the code in the words of the table in FIG. 5. In the absence of an error, output lines 62, 63 and 64 will be at binary "0." However, if an error is present, one or more of lines 62, 63 and 64 will be a binary "1." The combination of lines 62, 63 and 64 which are at a binary "1" will be indicative of the bit position which is in error. In order to determine this bit position, line 62 is assigned the "value of 1, " line 63 is assigned the "value of 2" and line 64 is assigned the "value of 4." Accordingly, if lines 62, 63 and 64 are in the combined "100" binary state, the total value will be 1 and this will indicate an error in the first bit position corresponding to the first track. Likewise, if the combined value at 62, 63 and 64 is 101 this will add up to a total value of 5, indicative of an error in the fifth bit position. If the combined value is 111, this will be indicative of an error in the seventh bit position. Decoder 65, to which lines 62, 63 and 64 are applied, is a standard decoding means for decoding the combined binary state of lines 62, 63 and 64 in accordance with the values set forth above and providing an "up" output on only one of the lines 66, each of which is respectively connected to one of the correctors 53 associated with one of the data tracks as will be hereinafter described in greater detail. Lines 66 are referred to as Hamming error pointers because an "up" value on line 66 is only applied and thus points to the corrector associated with the bit indicated to be in error. In this manner, the standard single-error Hamming code detection is achieved.

At this point the apparatus only indicates that a Hamming error condition exists and an alleged error position is pointed to by one of lines 66. Now, in order to determine whether more than one error may exist and whether the Hamming error condition is odd or even, the Hamming error detection information must be coordinated with the information obtained from parity checker 55. This is accomplished as follows. Lines 62, 63 and 64 are respectively connected to OR gate 67 by means of lines 68, 69 and 70. If one or more of lines 62, 63 and 64 are up, indicative of the presence of a Hamming error, OR gate 67 will produce an "up" output on line 71 which will be respectively applied to OR gate 72 and AND gate 73 by means of input lines 74 and 75. Line 58 from the parity checker, which has been described as being "up" in the presence of a parity error and "down" in the absence of a parity error, is also applied to OR gate 72 via input line 76, and the binary level on line 58 is inverted by inverter 77 and applied to AND gate 73 by line 78. Since OR gate 72 may be activated by either a Hamming error or a parity error, in the absence of both types of error, OR gate 72 will be non-conductive, the output on line 79 will be down and consequently, the output on line 81 from inverter 80 will be up. On the other hand, in the case where there is a Hamming error condition but no parity error, both inputs 75 and 78 to AND gate 73 will be up and the gate will be rendered conductive, bringing line 82 up to indicate an even number of errors.

Thus, an "up" output on a respective one of lines 82, 81 or 58 will respectively indicate the "none," "odd" or "even" branches from the Hamming error decision box in the flow chart of FIG. 1.

If line 81 is up, lines 82 and 58 will be down. An up signal on line 81 will be applied to OR gate 83 in FIG. 4 which in turn will produce the signal to appropriate means for passing the parallel binary data as good data.

Figures 4, 5:
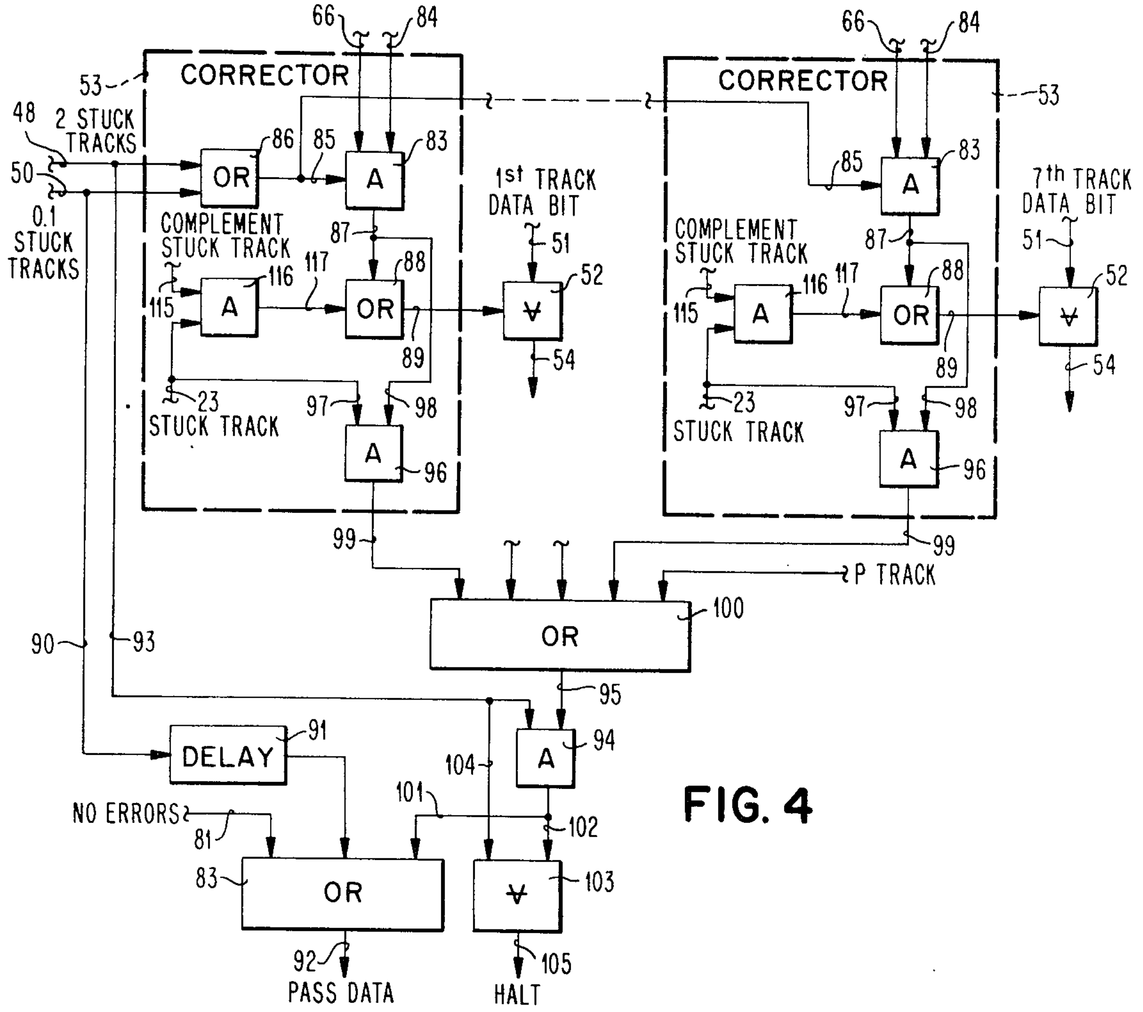
FIG. 4 is a circuit logic diagram showing in greater detail the means for correcting Hamming errors and for complementing stuck tracks as well as the means for determining the coincidence of stuck tracks with Hamming errors.
FIG. 5 is a table showing the Hamming code and parity check bit used to illustrate the embodiment of the invention shown in FIGS. 2, 3 and 4.

Considering now the implementing of the odd Hamming error branch in the flow chart of FIG. 1, when there are an odd number of errors, line 58 in FIG. 3 will be up, while lines 81 and 82 will be down. The value of line 58 is applied via line 84 to each of the eight correctors 53 associated with each of the eight data bit lines 51 through 51''. With reference to FIG. 4, there is shown a more detailed view of a corrector unit circuitry. Line 84 is applied to AND gate 83 in each of the corrector units 53. Also applied to each of AND gates 83 is line 85 from OR gate 86. Simultaneously, an "up" level on line 84 which is also connected to gating terminals 47 and 49 in gates 41 and 42 of the stuck track counter shown in FIG. 2B, results in either line 48 or 50 being up, dependent respectively on whether there are two stuck tracks or 0,1 stuck track. Since lines 48 and 50 are applied to OR gate 86, as shown in FIG. 4, OR gate 86 will be activated. In either case, line 85 which is applied to AND gate 83 will be "up" in the presence of two or less stuck tracks. Since both inputs 84 and 85 to all of the AND gates 83 are up, and only the Hamming error pointer line 66 to the AND gate 83 in the corrector associated with the data track bit indicated to be in error is also up, gate 83 will be turned on only in the corrector associated with the data bit indicated to have a Hamming error. In this corrector, output line 87 will go up, rendering OR gate 88 active; this will apply an up input on line 89, which is applied to Exclusive OR gate 52, the gate to which the data bit binary level is also applied via line 51. Such an up input on line 89 will cause Exclusive OR gate 52 to reverse the binary level output on line 54 to the opposite binary level from that applied on input line 51. Therefore, the binary level on line 54 will represent the correct bit binary level of the bit indicated to be in error. On all the other tracks, there will be no such up input on line 89 as a result of the Hamming error correction, and consequently, the binary level on line 54 will remain unchanged from that on line 51.

If there are not two stuck tracks, i.e., 0,1 stuck tracks, then the up signal on line 50 is applied by means of line 90 through delay means 91 to OR gate 83 to activate OR gate 83 to provide the up signal on line 92 which is then transmitted to means (not shown) which pass the corrected data as good. This represents No branch of the two stuck track decision block shown in FIG. 1. Delay means 91 insures that there is sufficient time for the data bit indicated to be in error, to be corrected by means of Exclusive OR gate 52 prior to the pass signal being given on line 92.

Let us now consider the implementation of the Yes branch of the two stuck track decision block in FIG. 1. In addition to being applied to OR gate 86, an up level on line 48 indicative of two stuck tracks is also applied via line 93 to one input of AND gate 94. The other input 95 to AND gate 94 will only be activated if there is a coincidence between the data bit indicated to be in error and the stuck track, i.e., the bit indicated to be in error by the Hamming means is also on a track indicated to be stuck. This is achieved as follows. Lines 23 from each of the stuck track indicator triggers 20 are applied to each of AND gates 96 in each of the corrector units via input 97; if the track is stuck, line 23 and consequently, input 97 will be up. Also, output line 87 from AND gate 83 is connected to AND gate 96 through line 98. Accordingly, since line 87 is up only in the one corrector unit associated with the bit having the indicated Hamming error, input line 98 will also be up in that corrector. If the track providing the bit in error is stuck, line 97 will also be up and consequently, AND gate 96 will be activated to provide an up signal on line 99, applied to OR gate 100. Thus, the coincidence of a stuck track and an indicated Hamming error in any one of the data track bits in the parallel data, the line 99 associated with that bit will be up and OR gate 100 will be activated to produce an up level on input line 95 to AND gate 94. Since there are two stuck tracks, the other input 93 to AND gate 94 will also be up and AND gate 94 will be activated. This will produce an up level on input 101 to OR gate 83 which will activate OR gate 83, and the corrected data will be passed as good. Simultaneously, input 102 to Exclusive OR gate 103 will be up. In addition, since there are two stuck tracks, input 104 to Exclusive OR gate 103, will also be up. In the presence of two up inputs, Exclusive OR gate 103 will remain inactive and halt signal line 105 will be down. It should be noted that when embodying this Exclusive OR circuitry, Exclusive OR gate 103 has inputs which can be adversely effected by race conditions. For example, where inputs 102 and 104 are to be up, the arrival of an up input on 102 before the arrival of the up input on 104 may cause halt signal line 105 to momentarily go up. In order to avoid halting on such a transient up signal, the halting means may be associated with the timing means which does not determine the halt condition until the inputs to gate 103 have had time to stabilize.

However, if there is no coincidence between a stuck track and a Hamming error in the particular bit, all of lines 99 will be down, OR gate 100 will be inactive, line 95 will be down, AND gate 94 will be inactive and lines 101 and 102 will be down. Accordingly, OR gate 83 will be inactive and there will be no up signal on the pass data line 92. On the other hand, since there are two stuck tracks, input line 104 will be the only input to Exclusive OR gate 103 which will be up. This will activate Exclusive gate 103 and output line 105 will be up to provide the signal which will be applied to appropriate means for halting the apparatus.

In the previous discussion with respect to the flow chart, we gave the reason for making the various decisions involved. At this point, we will elaborate as to why decision is made to halt the system when there is a combination of two stuck tracks, an indicated Hamming error, but the indicated Hamming error is not coincident with one of the stuck tracks. We have discovered that by the very nature of Hamming code error detection, i.e., the parallel binary data pattern is broken down into a plurality of sub-groupings each of which contains one Hamming check bit, and the Hamming parity of each sub-grouping is checked by means one of Exclusive OR trees 59, 60 or 61 in FIG. 3, the bit indicated to be in error is the bit actually in error only if there is one error present. In other words, if two or three bits in the data pattern are in error, the bit indicated or pointed to by this Hamming code detection means to be in error will actually be a bit which is correct. Therefore, if an attempt is made to change the bit which is already correct, the error condition will only be compounded.

Accordingly, where there are two stuck tracks and the indicated Hamming error does not coincide with the stuck track, two situations could produce such a combination:

1. two stuck tracks which are stuck at the correct bit for the particular data pattern being considered plus an error in a bit not on a stuck track; or
2. two stuck tracks at least one of which is stuck at a bit actually in error for the data pattern, plus additional possible error or errors in other data bits which produce a Hamming code indication or point at a bit not actually in error as a result of the multiple error condition.

Because the second possible condition is incorrectible, and even in the case of the first condition, we have a triple fault condition which makes it quite risky to continue, the system is halted so that appropriate correction can be made manually.

Considering now the implementation of the Even (parity correct plus error condition) branch of the Hamming error decision box in FIG. 1, which is implemented by apparatus shown in FIG. 3. If there are an even number of errors, line 82 will be up and, consequently, input 106 to AND gate 107 will be up. Since this is the first pass through the circuit, first pass latch 108 has been set or reset by the previous application of an appropriate signal to reset terminal 109; this reset signal may conveniently be a timed up pulse applied coincidently with the application of the parallel data pattern to the Hamming error detection means. Consequently, output terminal 110 will be up and the other input 111 to AND gate 107 will be up, thereby activating AND gate 107 to bring line 112 up. This causes the application of an up level to complement latch 113 which has been previously set or reset via terminal 114 by the same timed pulse which reset latch 108 so that an up level on line 112 will produce an up output on line 115 from latch 113. Line 115 is applied to AND gate 116 in each of the corrector units shown in FIG. 4. In the AND gates 116 in correctors associated with tracks which are stuck, the other input from line 23 will also be up, resulting in the activation of AND gate 116 to produce an up level on line 117 and thereby activate OR gate 88 which in turn, brings input 89 to Exclusive OR gate 52 up. This causes Exclusive OR gate 52 to produce on line 54, the complement or reverse of the binary state of the data bit applied via line 51.

The data on lines 54, including the complemented data from stuck tracks, is still applied to Exclusive OR trees 59, 60 and 61 of the Hamming error detector as well as to parity checker 55, in the manner which has been previously described. If the complementing of the stuck track has resulted in a change in the Hamming error condition, line 82 which has been up, should go down and either line 81 or line 84 should come up. If line 81 comes up, the complementing procedure has corrected all errors; no errors are present and the corrected data is passed as good. If line 84 comes up, then the complementing of the stuck track has resulted in the change from an even error condition to an odd error condition, and this odd error condition is then handled in accordance with the odd branch of the error decision box, the implementation of which has been previously described.

On the other hand, the complementing of the stuck track may fail to change the Hamming error condition, in which case line 82 will remain up. The previously mentioned up level on line 112, which was applied to complement latch 113, has also been applied to delay means 118, the function of which is to provide a delay sufficient for the described complementing steps to take place and the new error condition to stabilize. Thus, upon the completion of the complementing step, the up level from line 112 is applied to first pass latch 108 via line 119. This brings line 110 down, shutting AND gate 107 off. The output on 110 is inverted through inverter 120 to bring input terminal 121 of AND gate 122 up. Since the other input to AND gate 122 from line 82 remains up, the gate is activated and line 123 is brought up to signal appropriate apparatus to halt the system.

The embodiment previously described is intended to illustrate how in accordance with the present invention, the combination of parity error, Hamming bit error, coincident condition, stuck track condition and stuck track count may be correlated to detect and/or correct parallel binary data when predetermined combinations of said conditions occur. The primary advantage of the present invention is not so much to teach the varied combinations of said conditions which may be respectively responded to by various detection and/or correction procedures but, rather, the present invention provides the means for determining and correlating the conditions.

It should be understood that, at the present time, the capability of embodiments of the present invention does not go beyond the consistent handling of triple-fault and/or triple-error conditions. In other words, if there are four faults, and particularly four Hamming type errors, the embodiments of the present invention are not capable of handling such a condition with any consistency. This is, to a great extent, due to limitations in the Hamming code. It can be foreseen that if commercially practical Hamming codes circuitry is developed which goes beyond the double detect/single correct capability of present Hamming codes circuitry, the combination of the present invention will still further extend the capabilities of systems containing such Hamming code circuitry.

Figure 6:
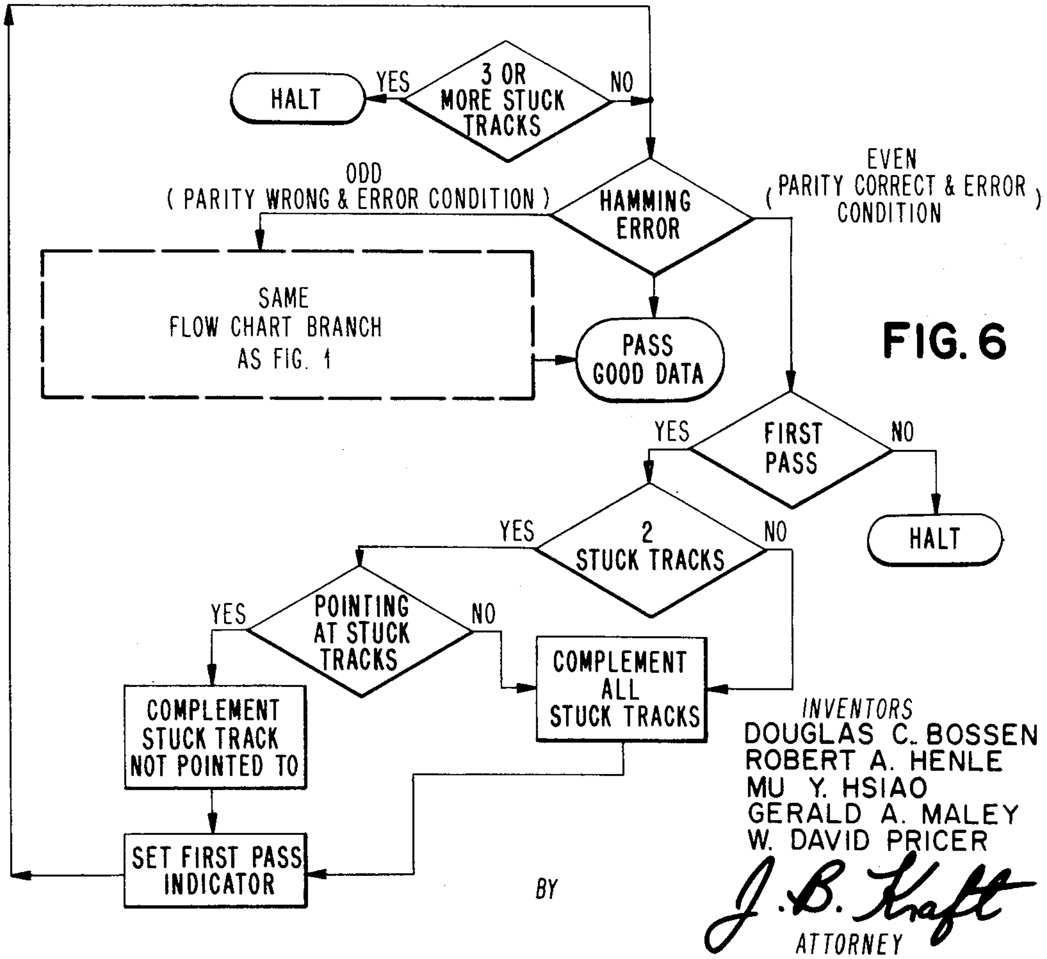
FIG. 6 is a flow chart illustrating another embodiment of the system of the present invention.

In order to illustrate that the information detected and correlated in the previously illustrated embodiment of the present invention may be responded to with a different detection/correction procedure, FIG. 6 illustrates a system for handling the Even branch of the Hamming error decision box illustrated in FIG. 1. In this Even branch, on the first pass, a decision is made as to whether only two tracks are stuck. If that decision is No, the stuck track is complemented, the first pass indicator is set as previously described, and the complemented data is again subjected to the Hamming error decision means in the manner illustrated with respect to FIG. 1. On the other hand, if two stuck tracks are present, a decision is made as to whether the bit indicated by the Hamming means to be in error, coincides with a stuck track. If that decision is No, the procedure of complementing all of the stuck tracks and recycling the data to the Hamming error decision means, is carried out. On the other hand, if the bit indicated by the Hamming means to be in error, does coincide with the stuck track, only the other stuck track is complemented and the complemented data recycled to the Hamming error decision means as previously described. The basis for this decision is that since there are an even number of errors present, there must be more than one Hamming error. As we have previously indicated, in the presence of two or three Hamming errors, the Hamming error indicating means does not point to a bit actually in error, but points to a correct bit. Accordingly, the stuck track which coincides to the bit pointed to by the Hamming means must be stuck at a correct bit condition and need not be complemented. Otherwise, if all of the stuck tracks were complemented whatever error might have been corrected in the stuck tracks not pointed to, would only be reintroduced into the stuck track pointed to since that track is already at a correct bit.

It should be noted that because the circuitry in the illustrative embodiments of the present invention is digital or nonlinear in characteristic, for convenience in description, the terms "up" and "down" have been used to describe the binary states of various points throughout the circuit; "up" should be considered as equivalent to a binary "1" and "down" should be considered to be equivalent to a binary "0."

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for detecting errors in a parallel binary data pattern made of a plurality of binary bits, each of said bits being respectively produced by one of a plurality of data tracks comprising means for receiving the bits produced by said tracks and detecting which tracks are in an inalterable condition;

means receiving the parallel data pattern for detecting the presence of bit error condition in said binary data and for indicating the proper bit position in said data pattern of an error only when a single error is present in said pattern;

means responsive to said two previous means for determining if said indicated bit error is coincident with a track determined to be in an inalterable condition.

2. The apparatus of claim 1 wherein each of the tracks comprises cycling sequential binary data bits containing at least one check bit which is the binary complement of the next preceding bit, and said means for detecting which tracks are in an inalterable condition comprise:

means for detecting a change in the binary state in each of said cycling data tracks means for cycling said tracks so that each of said check bits and next preceding bits pass said detecting means, and means responsive to each of said detecting means for indicating that the track corresponding to the detecting means is in an inalterable condition in the absence of a detected change.

3. The apparatus of claim 1 wherein said error detecting and indicating means are Hamming Error detecting means.

4. The apparatus of claim 1, further including means associated with said inalterable track detecting means for counting the inalterable tracks, means receiving the parallel data pattern for detecting the presence of a parity error in the binary data pattern, means responsive to said parity error-detecting means, bit error-detecting means, coincidence determining means, said inalterable track detecting means and said inalterable track counting means for correlating said detected parity error, bit error, coincident and inalterable track conditions with said inalterable track count, and complementing means responsive to said correlating means for selectively complementing bits produced by at least one of said inalterable tracks when said correlated conditions and count correspond to a predetermined combination of said conditions and count.

5. The apparatus of claim 4 wherein each of the tracks comprises cycling sequential binary data bits containing at least one check bit which is the binary complement of the next preceding bit, and said means for detecting which tracks are in an inalterable condition comprise:

means for detecting a change in the binary state in each of said cycling data tracks means for cycling said tracks so that each of said check bits and next preceding bits pass said detecting means, and means responsive to each of said detecting means for indicating that the track corresponding to the detecting means is in an inalterable condition in the absence of a detected change.

6. The apparatus of claim 1, further including means associated with said inalterable track detecting means for counting the inalterable tracks, means receiving the parallel data pattern for detecting the presence of a parity error in the binary data pattern, means responsive to said parity error-detecting means, bit error-detecting means, coincidence determining means, said inalterable track detecting means and said inalterable track counting means for correlating said detected parity error, bit error, coincident and inalterable track conditions with said inalterable track count, and correcting means responsive to said correlating means for selectively correcting said indicated bit position error when said correlated conditions and count correspond to a predetermined combination of said conditions and count.

7. The apparatus of claim 6 wherein said bit error detecting and indicating means are Hamming Error detecting means and said means for correcting said indicated bit position error are Hamming Error correction means.

8. The apparatus of claim 6 further including complementing means responsive to said correlating means for selectively complementing bits produced by at least one of said inalterable tracks when said correlated conditions and count correspond to a predetermined combination of said conditions and count.

9. The apparatus of claim 6 wherein said correcting means respond to a predetermined combination with a count of two.

10. The apparatus of claim 8 wherein said correcting means respond to a predetermined combination with a count of two.

11. The apparatus of claim 5 wherein said complementing means respond to a predetermined combination in which there is a bit error condition and no parity error.

12. The apparatus of claim 8 wherein said complementing means respond to a predetermined combination in which there is a bit error condition and no parity error.

13. The apparatus of claim 4 wherein said complementing means respond to a predetermined combination in which there is a bit error condition, no parity error, two inalterable tracks and a coincident condition, and said complementing means complement only the inalterable track which is not coincident with said indicated random error bit position.

14. The apparatus of claim 13 wherein said error detecting and indicating means are Hamming Error detecting means.

15. The apparatus of claim 8, further including means responsive to said inalterable track counting means for halting the apparatus when the count of inalterable tracks is at least three.

16. The apparatus of claim 1 wherein each of said tracks is a shift register.

17. The apparatus of claim 8 wherein each of said tracks is a shift register.

18. The apparatus of claim 16 wherein said shift registers are integrated semiconductor circuits.

19. The apparatus of claim 17 wherein said shift registers are integrated semiconductor circuits.

20. Apparatus for detecting and correcting errors in a parallel binary data pattern made of a plurality of binary bits, each of said bits being respectively produced by one of a plurality of data tracks comprising means for receiving the bits produced by said tracks and determining which tracks are in an inalterable condition;

means associated with said inalterable track determining means for counting the number of tracks in said inalterable condition;

means responsive to said inalterable track counting means for halting the apparatus when the count of inalterable tracks is at least three;

first detecting means receiving the parallel data pattern for detecting the presence of a parity error in the parallel binary data pattern;

second detecting means receiving the parallel data pattern for detecting the presence of a bit error condition in said binary data and for indicating one of the bits in said data pattern, said indicated bit being in error only when there is a single error in said binary data pattern;

means for applying said binary data pattern to said first and second detecting means;

means, responsive to said first and second detecting means and said inalterable track determining means and activated by the combination of the absence of a parity error and the presence of a bit error condition in the applied data pattern, for complementing the bits in said parallel data pattern produced by tracks in inalterable condition;

means for reapplying said complemented data pattern produced by said complementing means to said first and second detecting means;

means responsive to said first and second detecting means for providing an error output signal if said reapplied complemented data pattern still results in the combinations of the absence of a parity error and the presence of an error condition;

means responsive to said first and second detecting means for passing the original or reapplied data pattern as a good pattern in the absence of both said parity error and error condition;

means, responsive to said first and second detecting means and said inalterable track counting means and activated by the combination of the presence of a parity error and an indicated bit error in the original or reapplied data pattern and an inalterable track count of less than two, for correcting said indicated bit error and for passing the corrected data pattern as a good pattern;

means, responsive to said inalterable track determining means and said bit error detecting means, for determining if said indicated bit error is coincident with a stuck track; and means, responsive to said first and second detecting means, said inalterable track counting means, coincidence determining means and said inalterable track determining means and activated by the combination of the presence of a parity error and an indicated bit error in the original or reapplied data pattern and an inalterable track count of two for correcting said indicated bit error and for passing the corrected data pattern if said indicated bit error is coincident with a stuck track, or for providing an error output signal if said indicated bit error is not coincident with a stuck track.

21. The apparatus of claim 20 wherein each of said data tracks is a shift register.

22. The apparatus of claim 20, wherein said second detecting means are Hamming Error detection means and said means for correcting the indicated bit error are Hamming Error correction means.

23. The apparatus of claim 21 wherein said shift register is an integrated semiconductor circuit.

24. The apparatus of claim 20 wherein at least one of said means for providing an error output signal also halts the apparatus upon providing said error signal.

25. Apparatus for detecting whether a track of cycling sequential binary data bits is in an inalterable condition comprising means for complementing one of said bits in said track and for inserting said complemented bit into said track as a check bit, means for detecting a change in the binary state in said cycling data track, means for cycling said track so that said check bit and its corresponding original bit pass said detecting means, and means responsive to said detecting means for indicating that the track is in an inalterable condition in the absence of said detected change.

26. The apparatus of claim 25, wherein the entire data track is cycled past said detecting means, thereby insuring that the check bit and the original bit will be cycled past said detecting means.

27. The apparatus of claim 25 wherein said detecting and indicating means comprise a bistable circuit to which said check bit and said original bit are sequentially applied, the output state of said bistable circuit indicating whether there has been a change in binary state between said two applied bits.

28. The apparatus of claim 25 wherein said original bit passes said detection means immediately preceding said check bit.

29. Apparatus for detecting whether any of a plurality of tracks of cycling sequential binary data bits are in an inalterable condition comprising means for complementing one of said bits in each of said plurality of tracks and for inserting each of said complemented bits respectively into said plurality of tracks as check bits, means for detecting a change in the binary state in each of said cycling data tracks, means for cycling said tracks so that each of said check bits and their original bits pass said detecting means, and means responsive to each of said detecting means for indicating that the track corresponding to the detecting means is in an inalterable condition in the absence of a detected change.

30. The apparatus of claim 29 wherein each of said original bits passes its respective detection means immediately preceding its respective check bit in each of said tracks.

31. A method for detecting errors in parallel binary data made of a plurality of binary bits, each of said bits being respectively produced by one of a plurality of data tracks comprising detecting which tracks are in an inalterable condition;

by a single error Hamming Code Detection method, detecting the presence of a bit error condition in said binary data and indicating the proper bit position in said data pattern of an error only when a single error is present in said pattern, and determining if said indicated random error is coincident with a track determined to be in an inalterable condition.

32. The method of claim 31, further including the steps of counting the inalterable tracks, detecting the presence of a parity error in the binary data pattern, correlating said detected parity error, bit error, coincident and inalterable track conditions with said inalterable track count, and selectively complementing bits produced by at least one of said inalterable tracks when said correlated conditions and count correspond to a predetermined combination of said conditions and count.

33. The method of claim 31, further including the steps of counting the inalterable tracks, detecting the presence of a parity error in the binary data pattern, correlating said detected parity error, bit error, coincident error and inalterable track conditions with said inalterable track count, and selectively correcting said indicated Hamming error when said correlated conditions and count correspond to a predetermined combination of said conditions and count.

34. The method of claim 33, further including the step of selectively complementing bits produced by at least one of said inalterable tracks when said correlated conditions and count correspond to a predetermined combination of said conditions and count.

35. The method of claim 34 wherein said selective correction is made when said predetermined combination includes a count of two.

36. The method of claim 32 wherein said selective complementing is made when said predetermined combination includes a bit error condition, no parity error, two inalterable tracks and a coincident condition, and only the inalterable track which is not coincident with said indicated random error bit position is complemented.

37. A method for detecting and correcting errors in a parallel binary data pattern made of a plurality of binary bits, each of said bits being respectively produced by one of a plurality of data tracks comprising determining which tracks are in an inalterable condition;

counting the number of tracks in said inalterable condition;

halting the apparatus when the count of inalterable tracks is at least three;

detecting the presence of a parity error in the parallel binary data pattern;

by a single error Hamming Code Detection method detecting the presence of an error condition in said binary data and indicating one of the bits in said data pattern, said indicated bit being in error only when there is a single error in said binary data pattern, applying said binary data pattern to said first and second detecting means;

upon the combination of the absence of a parity error and the presence of an error condition in the applied data pattern, then complementing the bits in said parallel data pattern produced by tracks in inalterable condition;

reapplying said complemented data pattern to said first and second detecting means;

signaling an error if said reapplied complemented data pattern still results in the combination of the absence of a parity error and the presence of an error condition;

passing the original or reapplied data pattern as a good pattern in the absence of both said parity error and error condition;

upon the combination of the presence of a parity error in the original or reapplied data pattern and an inalterable track count of less than two, then correcting said indicated bit error and for passing the corrected data pattern as a good pattern;

determining if said indicated bit error is produced by a stuck track, and upon the combination of the presence of a parity error in the original or reapplied data pattern and an inalterable track count of two, then correcting said indicated bit error and for passing the corrected data pattern if said indicated bit error is produced in a stuck track, or providing an error output signal if said indicated bit error is not produced by a stuck track.

38. A method for detecting whether a track of cycling sequential binary data bits is in an inalterable condition comprising inserting into the track, at least one check bit which is the binary complement of the next preceding bit, and detecting whether there is a change in the binary state in said cycling data track during one cycle of the track.

* * * * *